United States Patent
Chin et al.

(10) Patent No.: US 8,000,460 B2
(45) Date of Patent: Aug. 16, 2011

(54) PROVIDING A CALL WAITING DISTINCTIVE RINGBACK FEATURE IN WIRELESS NETWORKS

(75) Inventors: Frances Mu-Fen Chin, Naperville, IL (US); Mauro Dal Pan, Bloomingdale, NJ (US); Terry Jacobson, Deerfield, IL (US); Lei Lei Wang, Beijing (CN)

(73) Assignee: Alcatel Lucent, Paris (FR)

( * ) Notice: Subject to any disclaimer, the term of this patent is extended or adjusted under 35 U.S.C. 154(b) by 1406 days.

(21) Appl. No.: 11/422,860

(22) Filed: Jun. 7, 2006

(65) Prior Publication Data

US 2007/0287427 A1 Dec. 13, 2007

(51) Int. Cl.
*H04M 3/42* (2006.01)
(52) U.S. Cl. .............................. 379/207.16; 379/215.01
(58) Field of Classification Search ............. 379/215.01, 379/252, 88.18, 211.02, 207.16, 211.01
See application file for complete search history.

(56) References Cited

U.S. PATENT DOCUMENTS

| | | | | |
|---|---|---|---|---|
| 5,926,537 A | * | 7/1999 | Birze | 379/252 |
| 7,120,240 B2 | * | 10/2006 | Edge et al. | 379/211.02 |
| 7,403,600 B2 | * | 7/2008 | Koch et al. | 379/88.18 |
| 2005/0180554 A1 | * | 8/2005 | Alston et al. | 379/207.16 |

* cited by examiner

*Primary Examiner* — Thjuan K Addy
(74) *Attorney, Agent, or Firm* — Duft Bornsen & Fishman LLP (57) ABSTRACT

Wireless networks and methods provide call waiting distinctive ringback. A wireless network of the invention comprises a switching system and a subscriber database. The switching system receives a registration request from a mobile device of a subscriber, transmits a registration message to the subscriber database, and receives a response message from subscriber database that includes a call waiting distinctive ringback indicator for the subscriber. If the switching system receives a call attempt from a calling party directed to the mobile device of the subscriber that is busy, then the switching system processes the call waiting distinctive ringback indicator to determine the type of ringback to provide for the call attempt, either distinctive ringback or non-distinct ringback.

18 Claims, 6 Drawing Sheets

| FIELD | VALUE | | | | | | | TYPE | REFERENCE | NOTES |
|---|---|---|---|---|---|---|---|---|---|---|
| Identifier | CallingFeaturesIndicator IMPLICIT OCTET STRING | | | | | | | M | Part 550 Section 1.2 | |
| Length | 2 or more octets | | | | | | | M | Part 550 Section 1.1 | |
| Contents | | | | | | | | | | |
| | H | G | F | E | D | C | B | A | Octet | Notes |
| | CW-FA | | CFNA-FA | | CFB-FA | | CFU-FA | | 1 | a |
| | CT-FA | | VP-FA | | CD-FA | | 3WC-FA | | 2 | a |
| | CNIROver-FA | | CNIR-FA | | CNIP2-FA | | CNIP1-FA | | 3 | a |
| | USCFvm-FA | | AH-FA | | DP-FA | | PCW-FA | | 4 | a |
| | CCS-FA | | CPDS-FA | | USCFnr-FA | | USCFms-FA | | 5 | a |
| | | | | | | | TDMA EPE-FA | | 6 | a, b |
| | ... | | | | | | | | | |
| | DRBforCW-FA | | | | | | | | n | c |

PROVIDING A CALL WAITING DISTINCTIVE RINGBACK FEATURE IN WIRELESS NETWORKS

BACKGROUND OF THE INVENTION

1. Field of the Invention

The invention is related to the field of wireless networks and, in particular, to providing a call waiting distinctive ringback feature to subscribers of a wireless network.

2. Statement of the Problem

If a calling party places a call to a called party, the sounds heard by the calling party when waiting for the called party to answer is referred to as ringback (or ringback tones). The wireless network over which the call is placed provides the ringback to the calling party, which is typically a ringing sound. As an example, the calling party places the call that is routed to a Mobile Switching Center (MSC) in the wireless network that is serving the called party. Responsive to receiving the call, the serving MSC determines the availability of the called party for the call. If the serving MSC determines that the called party is available, then the serving MSC provides ringing to the called party and provides ringback to the calling party. If the serving MSC determines that the called party is busy (i.e., presently on another call), then the serving MSC provides busy tones to the calling party.

If the called party subscribes to call waiting, then the serving MSC does not provide busy tones to the calling party. Instead, the serving MSC provides ringback to the calling party indicating that the called party is not busy and is available for the call. Some MSCs from some vendors are provisioned to provide a distinctive ringback to the calling party indicating that the called party is busy but has call waiting. Distinctive ringback refers to a type of ringback that is associated with call waiting so that the calling party hearing the distinctive ringback can understand that the called party is on another call and has subscribed to call waiting. The distinctive ringback may be a different ring pattern or a different sounding ring. Non-distinct ringback (or regular ringback) on the other hand is a type of ringback that is not associated with call waiting. Non-distinct ringback may include a traditional sounding series of rings.

One problem with present wireless networks is that they may not be able to provide distinctive ringback to subscribers in all areas of their network or when the subscribers are roaming. The ability to provide distinctive ringback depends on how the serving MSC is programmed, wired, or otherwise provisioned. As previously stated, MSCs from some vendors are provisioned to provide distinctive ringback for all calls where the called party is busy and has subscribed to call waiting. Other MSCs from other vendors are not provisioned to provide distinctive ringback at all. Unfortunately, service providers have to obtain MSCs from a certain vendor or vendors in order to provide distinctive ringback. If the service provider obtains MSCs from other vendors, then the service provider will not be able to provide the same type of ringback throughout their network. Also, the service provider may not be able to provide distinctive ringback for roaming subscribers.

SUMMARY OF THE SOLUTION

The invention solves the above and other problems by configuring wireless networks to provide a call waiting distinctive ringback feature to subscribers regardless of the how the switching systems (i.e., MSCs) are initially provisioned. To configure the wireless networks, a call waiting distinctive ringback indicator is added to the subscriber profile of a subscriber that has signed up for the call waiting distinctive ringback feature. The call waiting distinctive ringback indicator indicates whether the subscriber wants to provide distinctive ringback or non-distinct ringback for calls to the subscriber. Thus, any switching system receiving the subscriber profile can determine how the subscriber wants to handle ringback in call waiting scenarios. By providing the subscriber profile with the call waiting distinctive ringback indicator to each switching system that is serving a subscriber, the service provider can advantageously provide the same calling experience to subscribers no matter where the subscribers are traveling (roaming or otherwise). The service provider can also advantageously provide distinctive ringback to its subscribers regardless of which vendor supplied the switching systems of the home wireless network or roaming wireless networks.

In one embodiment of the invention, a wireless network comprises a switching system and a subscriber database. The switching system receives a registration request from a mobile device of a subscriber. Responsive to receiving the registration request, the switching system transmits a registration message to the subscriber database. The subscriber database updates the subscriber profile for the subscriber based on the information provided in the registration message. The switching system then receives a response message from subscriber database, where the response message includes a call waiting distinctive ringback indicator for the subscriber.

The switching system then receives a call attempt from a calling party directed to the mobile device of the subscriber. The mobile device and/or the subscriber are busy on another call at the time of the call attempt. The switching system processes the call waiting distinctive ringback indicator to determine the type of ringback to provide for the call attempt. If the call waiting distinctive ringback indicator indicates that distinctive ringback should be provided, then the switching system provides distinctive ringback to calling party for the call attempt. The distinctive ringback may be a different ring pattern or a different sounding ring. If the call waiting distinctive ringback indicator indicates that a non-distinct ringback should be provided, then the switching system provides a non-distinct ringback to the calling party for the call attempt.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
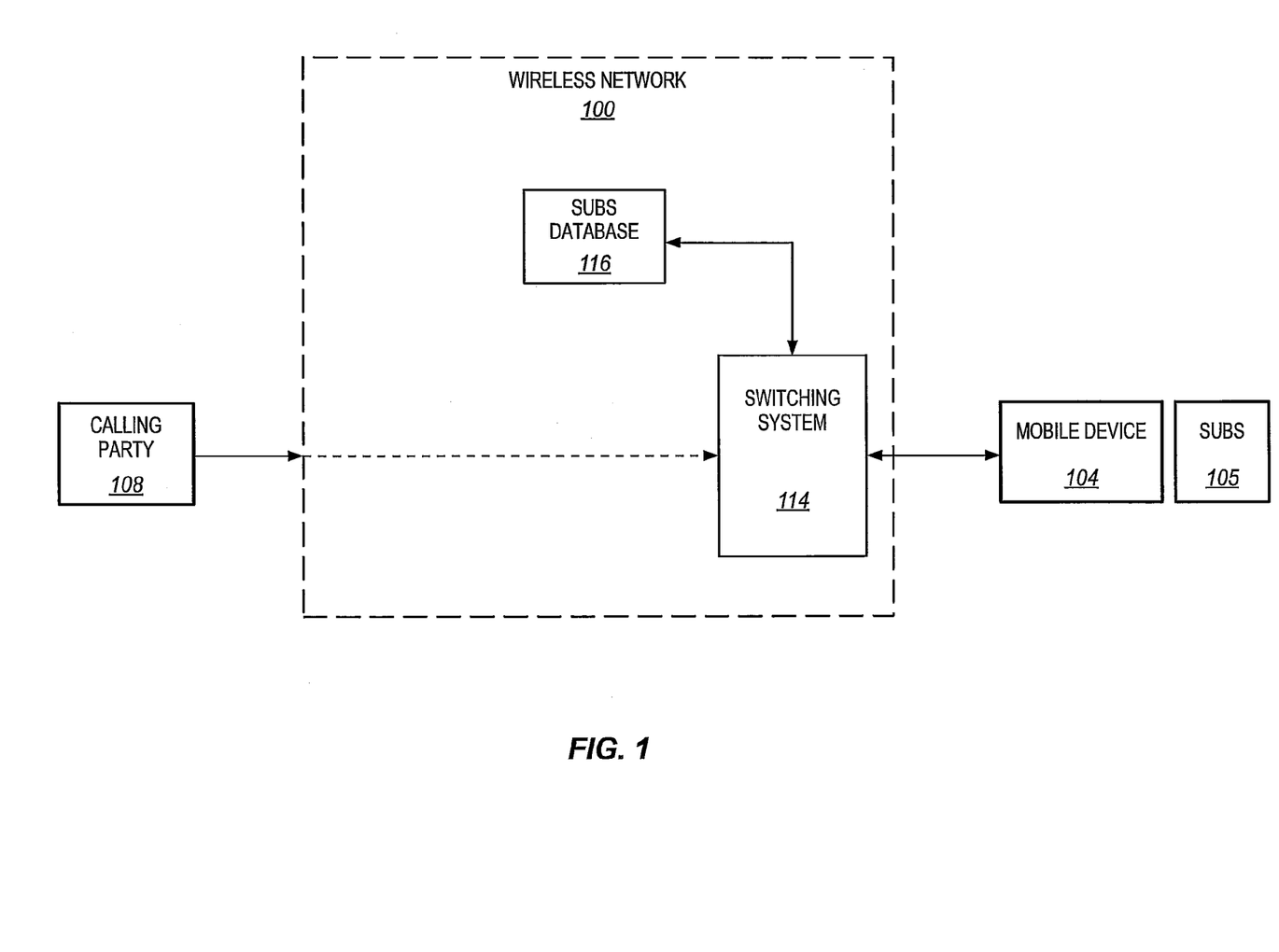
FIG. 1 illustrates a wireless network in an exemplary embodiment of the invention.

FIG. 1 illustrates a wireless network 100 in an exemplary embodiment of the invention. Wireless network 100 may comprise a CDMA network, a TDMA network, a GSM network, a UMTS network, etc. Wireless network 100 is adapted to provide wireless service to a mobile device 104 of a subscriber and to a plurality of other mobile devices not shown in FIG. 1. Wireless network 100 includes a switching system 114 and a subscriber database 116. Switching system 114 comprises any system, server, or switch adapted to provide call switching functionality in wireless network 100, such as a Mobile Switching Center (MSC). Subscriber database 116 comprises any system or server adapted to store subscriber-related data, such as subscriber profiles for the subscribers of wireless network 100. One example of subscriber database 116 is a home location register (HLR). Wireless network 100 may include other networks, systems, or devices not shown in FIG. 1, such as additional switching systems, additional subscriber databases, etc.

In this embodiment, switching system 114 is adapted to serve mobile device 104 being operated by subscriber 105. Mobile device 104 comprises any wireless communication device, such as a wireless (mobile) phone, a PDA, etc. Assume that subscriber 105 has subscribed to a wireless service provided by a service provider operating wireless network 100. Also assume that subscriber 105 has subscribed to a call waiting feature offered by the service provider. According to features and aspects herein, wireless network 100 may also provide a call waiting distinctive ringback feature for its subscribers.

Figure 2:
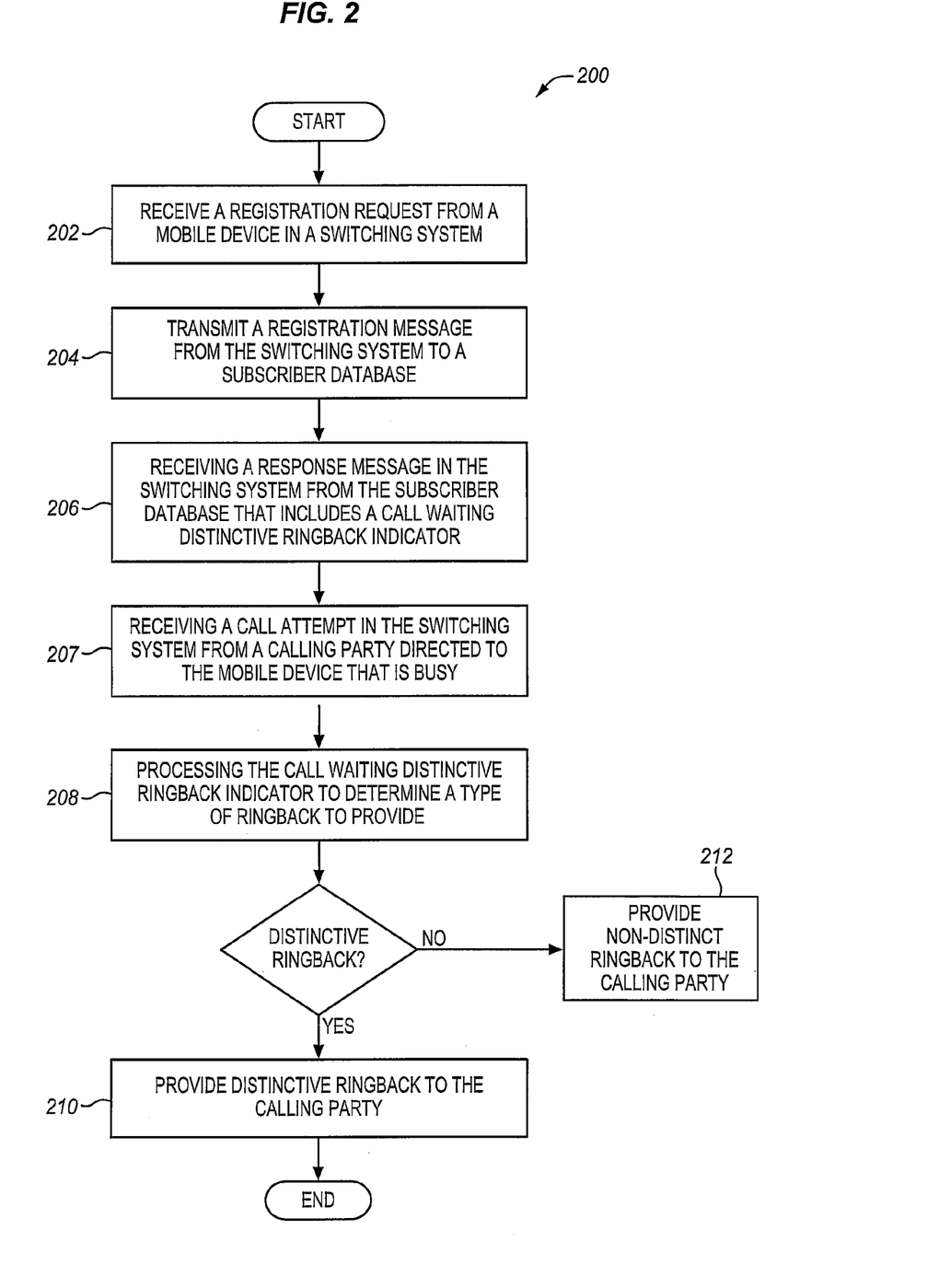
FIG. 2 is a flow chart illustrating a method of operating a wireless network to provide a call waiting distinctive ringback feature in an exemplary embodiment of the invention.

FIG. 2 is a flow chart illustrating a method 200 of operating wireless network 100 to provide a call waiting distinctive ringback feature in an exemplary embodiment of the invention. The steps of method 200 will be described with reference to wireless network 100 in FIG. 1. The steps of the flow chart in FIG. 2 are not all inclusive and may include other steps not shown.

In step 202, switching system 114 receives a registration request from mobile device 104 of subscriber 105. Mobile device 104 may transmit the registration request responsive to powering on, responsive to moving into a new coverage area serviced by switching system 114, etc. Responsive to receiving the registration request, switching system 114 transmits a registration message to subscriber database 116 in step 204. The registration message may include an identifier for subscriber 105, such as a directory number, a mobile identification number (MIN), etc. Subscriber database 116 receives the registration message and locates a subscriber profile for subscriber 105. Subscriber database 116 then updates the subscriber profile based on the information provided in the registration message. Subscriber database 116 then transmits a response message to switching system 114 that includes information on the subscriber, such as a copy of the subscriber profile or particular information stored in the subscriber profile.

In step 206, switching system 114 receives the response message from subscriber database 116. The response message includes a call waiting distinctive ringback indicator for subscriber 105. The call waiting distinctive ringback indicator comprises any code, bit sequence, or other data that indicates if distinctive ringback should be provided for calls to subscriber 105 or if non-distinct (i.e., regular) ringback should be provided for calls to subscriber 105.

In step 207, switching system 114 receives a call attempt from a calling party 108 directed to mobile device 104 (see also FIG. 1). The call attempt is illustrated as a dotted arrow through wireless network 100. Mobile device 104 and/or subscriber 105 are busy on another call at the time of the call attempt. Because subscriber 105 subscribes to call waiting, switching system 114 provides ringback instead of busy tones. In step 208, switching system 114 processes the call waiting distinctive ringback indicator to determine the type of ringback to provide. If the call waiting distinctive ringback indicator indicates that distinctive ringback should be provided, then switching system 114 provides distinctive ringback to calling party 108 for the call attempt in step 210. If the call waiting distinctive ringback indicator indicates that distinctive ringback should not be provided, then switching system 114 provides non-distinct ringback to calling party 108 for the call attempt in step 212.

By providing the call waiting distinctive ringback indicator to switching system 114, switching system 114 knows what type of ringback to provide. The type of ringback provided does not depend on the vendor that manufactured the switching system. Wireless network 100 can instruct its switching systems to provide distinctive ringback for a particular subscriber, and can also instruct switching systems in roaming networks to provide distinctive ringback using the call waiting distinctive ringback indicator. The service provider can advantageously provide a similar calling experience to its subscriber no matter where the subscribers are located.

Figure 3:
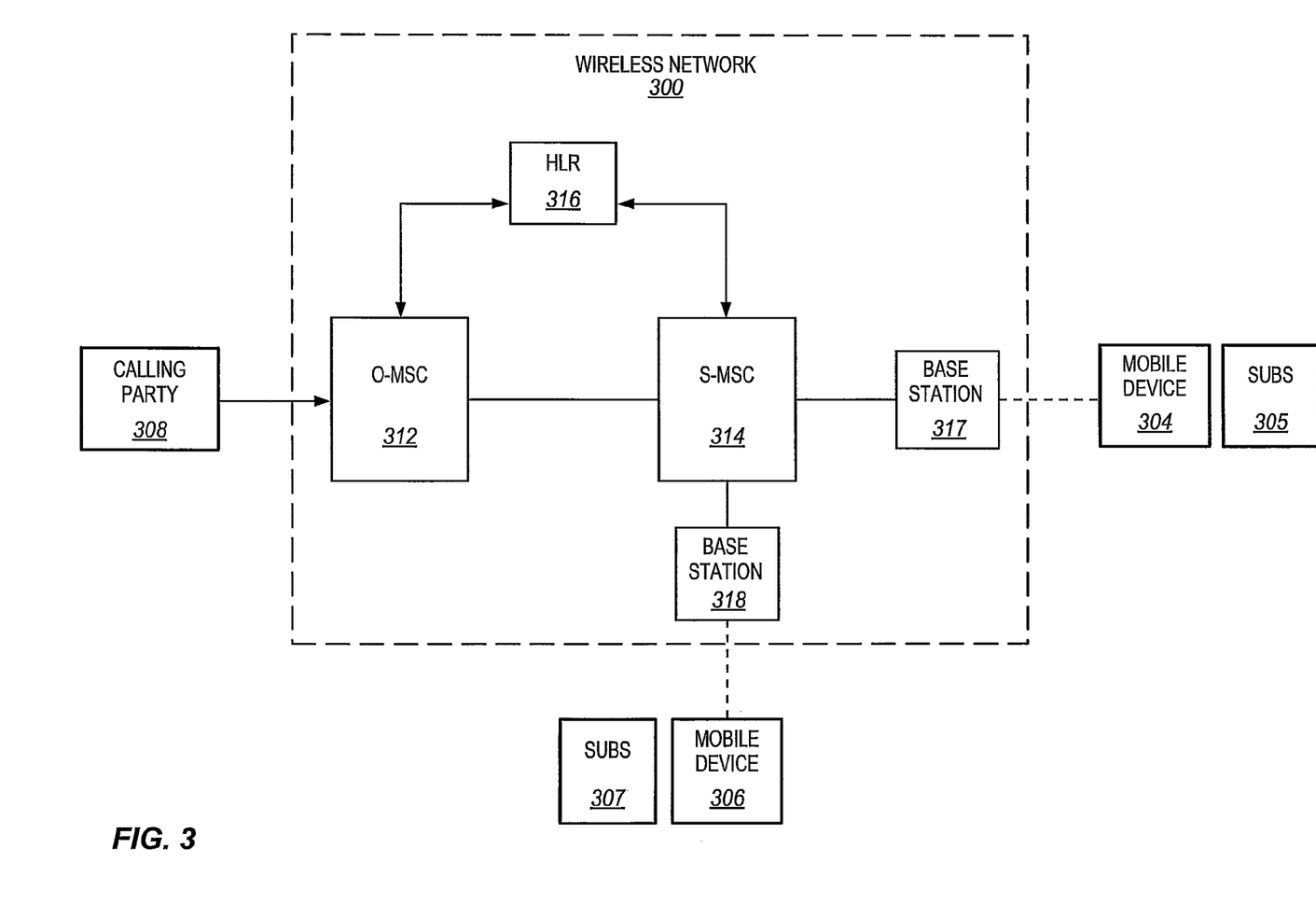
FIG. 3 illustrates another wireless network in an exemplary embodiment of the invention.

FIG. 3 illustrates a wireless network 300 in an exemplary embodiment of the invention. Wireless network 300 is adapted to provide wireless service to mobile device 304 operated by subscriber 305, and mobile device 306 operated by subscriber 307. Wireless network 300 includes an originating MSC (O-MSC) 312, a serving MSC (S-MSC) 314, an HLR 316, and base stations 317-318. S-MSC 314 is coupled to base station 317 to serve mobile device 304, and is coupled to base station 318 to serve mobile device 306. S-MSC 314 and O-MSC 312 are coupled to HLR 316. Wireless network 300 may include other networks, systems, or devices not shown in FIG. 3.

Figure 4:
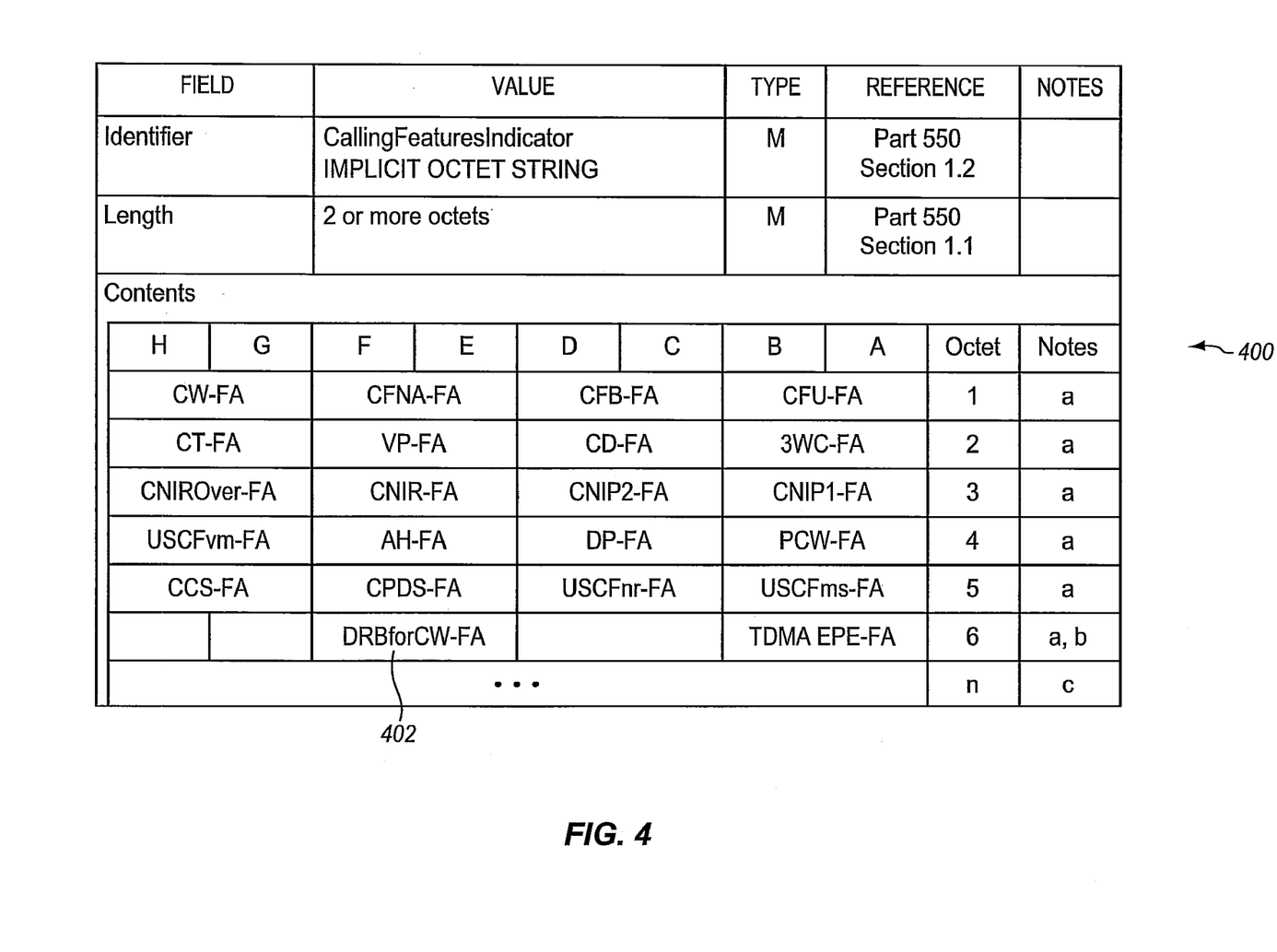
FIG. 4 illustrates an exemplary CallingFeaturesIndicator parameter in an exemplary embodiment of the invention.

HLR 316 is adapted to store subscriber profiles for subscriber 305 and 307. The subscriber profiles include an ANSI-41 CallingFeaturesIndicator parameter. The CallingFeaturesIndicator parameter indicates the features subscribed to by a subscriber, such as call waiting, call forwarding, etc. FIG. 4 illustrates an exemplary CallingFeaturesIndicator parameter 400 in an exemplary embodiment of the invention. CallingFeaturesIndicator parameter 400 lists a plurality of features in an octet string. For instance, octet 1, bits A and B represent a call forwarding—unconditional (CFU) feature activity. Octet 1, bits C and D represent a call forwarding—busy (CFB) feature activity. Octet 1, bits E and F represent a call forwarding—no answer (CFNA) feature activity. Octet 1, bits G and H represent a call waiting (CW) feature activity. According to features and aspects herein, one of the feature activities in CallingFeaturesIndicator parameter 400 represents a distinctive ringback for call waiting (DRBforCW) feature activity 402. This may be a new feature activity added to CallingFeaturesIndicator parameter 400. The distinctive ringback for call waiting (DRBforCW) feature activity 402 may be added to the CallingFeaturesIndicator parameter 400 in octet 6, bits E and F as illustrated in FIG. 4, but may alternatively be added in a different location hi the octet string of the parameter.

The value of the distinctive ringback for call waiting (DRBforCW) feature activity 402 may indicate how to handle ringback for calls to a subscriber. For instance, a value of 0 for the distinctive ringback for call waiting (DRBforCW) feature activity 402 may indicate that distinctive ringback is not used for this subscriber. A value of 1 for the distinctive ringback for call waiting (DRBforCW) feature activity 402 may indicate that distinctive ringback is not authorized for this subscriber. A value of 2 for the distinctive ringback for call waiting (DRBforCW) feature activity 402 may indicate that distinctive ringback is authorized but not activated for this subscriber. A value of 3 for the distinctive ringback for call waiting (DRBforCW) feature activity 402 may indicate that distinctive ringback is authorized and activated for this subscriber.

The subscriber, such as subscriber 305 in FIG. 3, may designate the value for the distinctive ringback for call waiting (DRBforCW) feature activity when signing up for the wireless service. For instance, the distinctive ringback feature may be bundled with call waiting when the subscriber signs up for service. The subscriber may have the option to provide distinctive ringback for all call waiting calls. The subscriber may additionally or alternatively be able to dynamically activate or deactivate the call waiting distinctive ringback feature, which gives the subscriber the power to control the type of ringback provided to calling parties.

Figure 5:
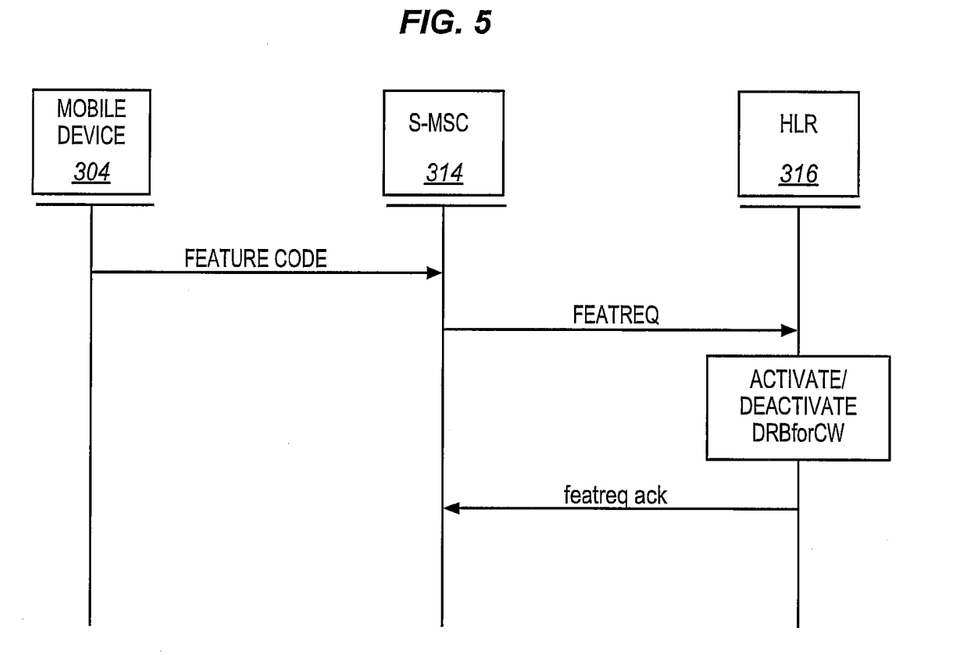
FIG. 5 is a message diagram illustrating activation/deactivation of the distinctive ringback feature in an exemplary embodiment of the invention.

FIG. 5 is a message diagram illustrating activation/deactivation of the call waiting distinctive ringback feature in an exemplary embodiment of the invention. Assume for instance that subscriber 305 wants to activate the call waiting distinctive ringback feature. Further assume that subscriber 305 moves into the coverage area of S-MSC 314, and mobile device 304 registers with S-MSC 314. Subscriber 305 may then enter a feature code, such as *97, into mobile device 304. Mobile device 304 transmits the digits for the feature code to S-MSC 314. S-MSC 314 is provisioned to handle the feature code as follows. Responsive to the feature code, S-MSC 314 transmits a feature request (FEATREQ) message to HLR 316. Responsive to the feature request message, HLR 316 updates the subscriber profile of subscriber 305 to activate the call waiting distinctive ringback feature. For instance, as described in FIG. 4, HLR 316 may add the appropriate value (such as "3") to the distinctive ringback for call waiting (DRBforCW) feature activity of CallingFeaturesIndicator parameter 400. HLR 316 then responds to S-MSC 314 with a feature request acknowledgement (featreq ack) message.

If subscriber 305 wants to deactivate the distinctive ringback feature, then the operation is as follows. Subscriber 305 again enters a feature code, such as *98, into mobile device 304. Mobile device 304 transmits the digits for the feature code to S-MSC 314. Responsive to the feature code, S-MSC 314 transmits a feature request (FEATREQ) message to HLR 316. Responsive to the feature request message, HLR 316 updates the subscriber profile of subscriber 305 to deactivate the distinctive ringback feature. For instance, as described in FIG. 4, HLR 316 may add the appropriate value (such as "2") to the distinctive ringback for call waiting (DRBforCW) feature activity of CallingFeaturesIndicator parameter 400. HLR 316 then responds to S-MSC 314 with a feature request acknowledgement (featreq ack) message.

Figure 6:
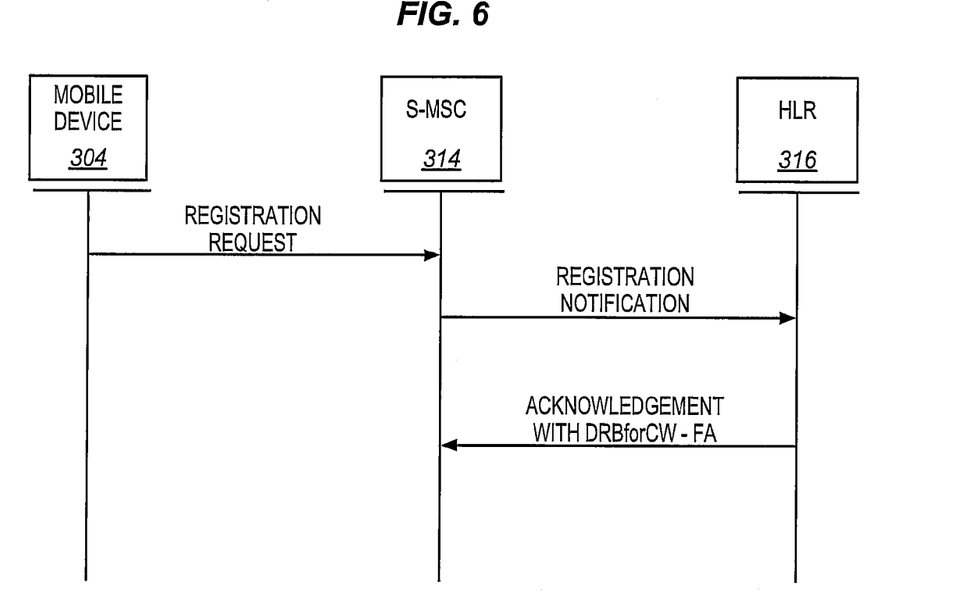
FIG. 6 is a message diagram illustrating registration of a mobile device of a subscriber in an exemplary embodiment of the invention.

When HLR 316 is provisioned with the distinctive ringback for call waiting (DRBforCW) feature activity, HLR 316 can provide the distinctive ringback for call waiting (DRBforCW) feature activity to any MSC that is serving subscriber 305. For instance, assume that subscriber 305 is in a coverage area served by base station 317 and S-MSC 314 as illustrated in FIG. 3. FIG. 6 is a message diagram illustrating registration of the mobile device 304 of subscriber 305 in an exemplary embodiment of the invention. Mobile device 304 may have been previously registered with S-MSC 314 or another MSC at some point (such as in FIG. 5 to activate or deactivate the feature). FIG. 6 illustrates the registration of mobile device 304 regardless of previous registrations.

When mobile device 304 moves into the coverage area of S-MSC 314, then mobile device 304 transmits a registration request to S-MSC 314. Responsive to the registration request, S-MSC 314 transmits a registration notification message to HLR 316. The registration notification message may include an identifier for subscriber 305, such as a directory number, a mobile identification number (MIN), etc. Responsive to the registration notification message, HLR 316 identifies a subscriber profile for subscriber 305. HLR 316 then transmits an acknowledgement message to S-MSC 314 that includes a copy of the subscriber profile or a portion of the information included in the subscriber profile. As described in FIGS. 4-5, the subscriber profile of subscriber 305 includes a CallingFeaturesIndicator parameter having a distinctive ringback for call waiting (DRBforCW) feature activity (FA). Thus, HLR 316 provides S-MSC 314 with the distinctive ringback for call waiting (DRBforCW) feature activity, which indicates how ringback should be handled for calls received by subscriber 305.

Figure 7:
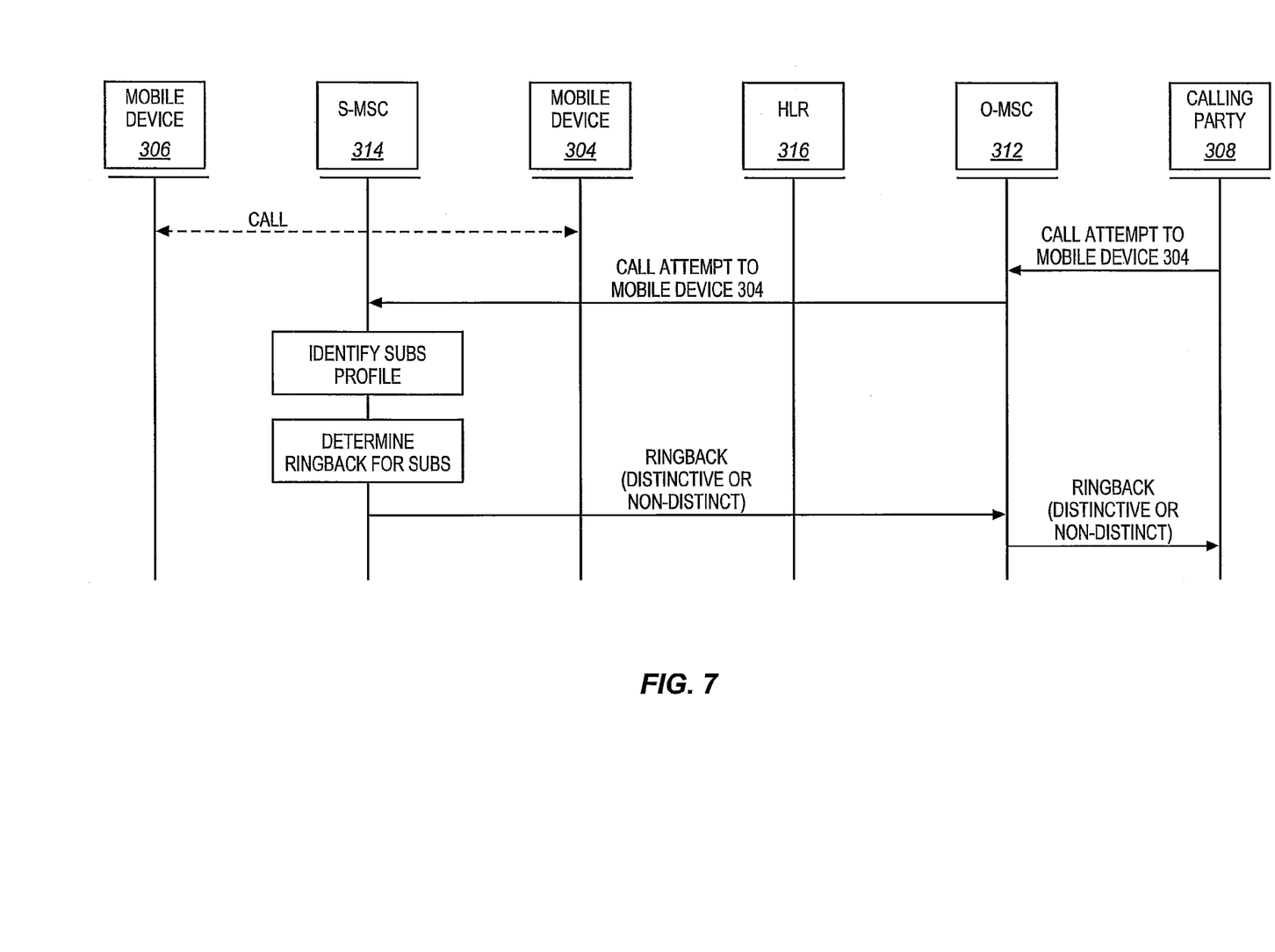
FIG. 7 is a message diagram illustrating how ringback is handled in the wireless network of FIG. 3 in an exemplary embodiment of the invention.

With mobile device 304 registered with S-MSC 314 in FIG. 3, assume that mobile device 306 places a call to mobile device 304 and subscriber 305 answers the call. An active call is thus established between mobile device 306 and mobile device 304 (i.e., mobile device 304 is busy. FIG. 7 is a message diagram illustrating how ringback is handled in wireless network 300 in an exemplary embodiment of the invention. In FIG. 7, an active call is established between mobile device 306 and mobile device 304. During this call, assume that calling party 308 attempts a call to mobile device 304. O-MSC 312 receives the call into wireless network 300. O-MSC 312 routes the call to S-MSC 314. Responsive to the call request, S-MSC 314 determines that mobile device 304 of subscriber 305 is busy (i.e., on another call). S-MSC 314 then identifies the subscriber profile for subscriber 305, and processes the subscriber profile or at least the CallingFeaturesIndicator parameter of the subscriber profile, to determine if subscriber 305 has subscribed to call waiting. Subscriber 305 has subscribed to call waiting in this embodiment, so S-MSC 314 further processes the CallingFeaturesIndicator parameter to determine if subscriber 305 has subscribed to the distinctive ringback feature. If the distinctive ringback for call waiting (DRBforCW) feature activity indicates that the feature is authorized and activated, then S-MSC 314 provides a distinctive ringback to calling party 308 indicating that mobile device 304 is on another call and has call waiting. If the distinctive ringback for call waiting (DRBforCW) feature activity indicates that the feature is not authorized or is authorized and deactivated, then S-MSC 314 provides a non-distinct ringback to calling party 308.

Although specific embodiments were described herein, the scope of the invention is not limited to those specific embodiments. The scope of the invention is defined by the following claims and any equivalents thereof.

We claim:

1. A method of operating a wireless network for providing a call waiting distinctive ringback feature, the method comprising:
    receiving a registration request in a switching system of the wireless network from a mobile device of a subscriber to register the mobile device with the wireless network;
    transmitting a registration message from the switching system to a subscriber database for the subscriber to retrieve a subscriber profile from the subscriber database;
    receiving a response message in the switching system from the subscriber database having the subscriber profile that includes a call waiting distinctive ringback indicator for the subscriber;
    receiving a call attempt in the switching system from a calling party directed to the mobile device of the subscriber that is busy on another call;
    processing the call waiting distinctive ringback indicator in the switching system responsive to the call attempt to determine the type of ringback to provide; and
    providing distinctive ringback to the calling party responsive to the determination of a distinctive ringback type; and
    providing non-distinctive ringback to the calling party responsive to the determination of a non-distinctive ringback type.

2. The method of claim 1 wherein:
    the response message includes a subscriber profile for the subscriber; and
    the subscriber profile includes a parameter having the call waiting distinctive ringback indicator.

3. The method of claim 2 wherein the parameter comprises an ANSI-41 CallingFeaturesIndicator parameter having a feature activity dedicated for the call waiting distinctive ringback indicator.

4. The method of claim 1 further comprising:
    receiving an instruction in the switching system from the mobile device of the subscriber to activate the call waiting distinctive ringback feature for the subscriber; and
    transmitting a request to activate the call waiting distinctive ringback feature from the switching system to the subscriber database.

5. The method of claim 4 further comprising:
    updating the call waiting distinctive ringback indicator in the subscriber database responsive to receiving the request to activate the call waiting distinctive ringback feature from the switching system.

6. The method of claim 4 wherein the instruction comprises a feature code received from the mobile device of the subscriber.

7. The method of claim 1 further comprising:
    receiving an instruction from the mobile device of the subscriber in the switching system to deactivate the call waiting distinctive ringback feature for the subscriber; and
    transmitting a request to deactivate the call waiting distinctive ringback feature from the switching system to the subscriber database.

8. A wireless network adapted to provide a call waiting distinctive ringback feature, the wireless network comprising:
    a subscriber database adapted to store a subscriber profile for a subscriber; and
    a switching system adapted to receive a registration request from a mobile device of a subscriber to register the mobile device with the wireless network, transmit a registration message to the subscriber database for the subscriber to retrieve the subscriber profile from the subscriber database, and receive a response message from the subscriber database having the subscriber profile that includes a call waiting distinctive ringback indicator for the subscriber;
    the switching system is further adapted to receive a call attempt from a calling party directed to the mobile device of the subscriber that is busy on another call, process the call waiting distinctive ringback indicator responsive to the call attempt to determine the type of ringback to provide, provide distinctive ringback to the calling party responsive to the determination of a distinctive ringback type, and provide non-distinctive ringback to the calling party responsive to the determination of a non-distinctive ringback type.

9. The wireless network of claim 8 wherein:
    the response message includes a subscriber profile for the subscriber; and
    the subscriber profile includes a parameter having the call waiting distinctive ringback indicator.

10. The wireless network of claim 9 wherein the parameter comprises an ANSI-41 CallingFeaturesIndicator parameter having a feature activity dedicated for the call waiting distinctive ringback indicator.

11. The wireless network of claim 8 wherein the switching system is further adapted to:
    receive an instruction from the mobile device of the subscriber to activate the call waiting distinctive ringback feature for the subscriber; and
    transmit a request to activate the call waiting distinctive ringback feature to the subscriber database.

12. The wireless network of claim 11 wherein the subscriber database is further adapted to:
    update the call waiting distinctive ringback indicator in a subscriber profile for the subscriber responsive to receiving the request to activate the call waiting distinctive ringback feature from the switching system.

13. The wireless network of claim 11 wherein the instruction comprises a feature code received from the mobile device of the subscriber.

14. The wireless network of claim 8 wherein the switching system is further adapted to:
    receive an instruction from the mobile device of the subscriber in the switching system to deactivate the call waiting distinctive ringback feature for the subscriber; and
    transmit a request to deactivate the call waiting distinctive ringback feature from the switching system to the subscriber database.

15. A method of operating a wireless network for providing a call waiting distinctive ringback feature, the method comprising:
    storing a subscriber profile for a subscriber that includes a call waiting distinctive ringback indicator for the subscriber;
    receiving a call attempt from a calling party directed to a mobile device of the subscriber that is busy on another call;
    processing the call waiting distinctive ringback indicator and transmitting distinctive ringback to the calling party for the call attempt responsive to the call waiting distinctive ringback indicator indicating that distinctive ringback should be applied to call attempts to the subscriber; and processing the call waiting distinctive ringback indicator and transmitting non-distinctive ringback to the calling party for the call attempt responsive to the call waiting distinctive ringback indicator indicating that distinct ringback should not be applied to call attempts to the subscriber.

16. The method of claim 15 wherein the subscriber profile includes an ANSI-41 CallingFeaturesIndicator parameter having a feature activity dedicated for the call waiting distinctive ringback indicator.

17. The method of claim 15 further comprising:
receiving an instruction from the mobile device of the subscriber to activate the call waiting distinctive ringback feature for the subscriber; and
updating the subscriber profile for the subscriber such that the call waiting distinctive ringback indicator indicates that distinct ringback should be applied to call attempts to the subscriber.

18. The method of claim 15 further comprising:
receiving an instruction from the mobile device of the subscriber to deactivate the call waiting distinctive ringback feature for the subscriber; and
updating the subscriber profile for the subscriber such that the call waiting distinctive ringback indicator indicates that distinct ringback should not be applied to call attempts to the subscriber.

* * * * *

UNITED STATES PATENT AND TRADEMARK OFFICE
CERTIFICATE OF CORRECTION

PATENT NO. : 8,000,460 B2
APPLICATION NO. : 11/422860
DATED : August 16, 2011
INVENTOR(S) : Chin et al.

Page 1 of 1

It is certified that error appears in the above-identified patent and that said Letters Patent is hereby corrected as shown below:

In column 5, line 9, the text "a different location hi the octet string" should read -- a different location in the octet string --

Signed and Sealed this
Twenty-fifth Day of October, 2011

David J. Kappos
*Director of the United States Patent and Trademark Office*